(12) United States Patent
Yang

(10) Patent No.: US 6,839,248 B2
(45) Date of Patent: Jan. 4, 2005

(54) FLYBACK POWER SUPPLY DEVICE AND CONTROL METHOD THEREOF

(75) Inventor: Hui Chiang Yang, Taipei Hsien (TW)

(73) Assignee: Ko Semiconductors Co., Ltd., Taipei (TW)

( * ) Notice: Subject to any disclaimer, the term of this patent is extended or adjusted under 35 U.S.C. 154(b) by 70 days.

(21) Appl. No.: 10/426,829

(22) Filed: May 1, 2003

(65) Prior Publication Data

US 2004/0217752 A1 Nov. 4, 2004

(51) Int. Cl.$^7$ ............................................. H02M 3/335
(52) U.S. Cl. ............................... 363/21.12; 363/21.14; 363/127
(58) Field of Search ................................ 363/17, 21.01, 363/21.12, 21.14, 21.15, 21.17, 89, 127

(56) References Cited

U.S. PATENT DOCUMENTS 5,708,572 A * 1/1998 Bergk ...................... 363/21.12
6,424,544 B1 * 7/2002 Svardsjo ................... 363/21.12
6,567,279 B2 * 5/2003 Brkovic ........................ 363/17

* cited by examiner

Primary Examiner—Jessica Han
(74) Attorney, Agent, or Firm—Browdy and Neimark, P.L.L.C.

(57) ABSTRACT

A flyback power supply device and its control method that can exactly switch off the switch component each time when the output voltage of the transformer is changed from positive to negative. The power supply device includes a transformer, a primary and secondary switch circuit. The primary and secondary switch circuits are connected with the primary and secondary sides of the transformer, respectively. The secondary switch circuit includes a control circuit and a switch component. The control circuit is used to keep the voltage across the switch component fixed and make the resistance of the switch component inversely proportional to the output current of the transformer. As the output current of the transformer changes as an inverse triangle, the resistance of the switch component will approach infinite when the output current is zero and the switch component will be switched off automatically to make the power supply device function well.

11 Claims, 5 Drawing Sheets

FLYBACK POWER SUPPLY DEVICE AND CONTROL METHOD THEREOF

FIELD OF THE INVENTION

The present invention is directed to a flyback power supply device and the control method thereof, and more particularly, to a power supply device that uses a switch component to perform the behavior of switching on or off.

BACKGROUND OF THE INVENTION

In accordance with prior art, the common circuit of flyback power supply device is shown in FIG. 1A. Therein, the component S1 can be a transistor, thyristor, metal-oxide-semiconductor field-effect transistor (MOSFET) or other components that can be switched on or off by a small signal. Generally, there is a voltage drop of 0.4–1.5V across the component D1 with forward bias (a feature of p-n junction diode). Hence, the flyback power supply device will be inefficient while the output voltage $V_O$ is low, or it will need a heat sink with large area due to its large power consumption. For example, if $V_O$ is 5Vdc, the voltage drop across D1 is 0.4V, the voltage limit of reverse bias across D1 is 30Vdc and the output power of the flyback power supply device is 50 W (5V/10 A), the power consumed by D1 will be 0.4V*10 A=4 W. If the power consumed by other components is ignored, the efficiency of the flyback power supply device will be 50 W/(50 W+4 W)=92.6%.

The present circuit of flyback power supply device is shown in FIG. 1B. The component D1 is replaced by the component S2, which can be a transistor, thyristor, or MOSFET. By using the present technology, the on-resistance $R_{DS}(on)$ of MOSFET can reach about 10 mΩ easily, e.g. S14410. Hence, the power consumption can be reduced tremendously to overcome the drawback described above. Comparing with the example above, if $V_O$ is 5Vdc, the S2 is replaced by S14410 ($R_{DS}(on)$=11 mΩ, $V_{DS}$=30V) and the output power of the flyback power supply device is 50 W (5V/10 A), then the voltage drop of S2 will be 10 A*11 mΩ=110 m Vdc and the power consumed by S1 will be 110 m V*10 A=1100 m W=1 W. If the power consumed by other components is ignored, the efficiency of the flyback power supply device will be 50 W/(50 W+1.1 W)=97.8%. Hence, comparing with the one using p-n junction diode, there is 6.2% efficient improvement. This is the present aim for engineers to pursue. However, there is still a technical bottleneck while replacing D1 with S1.

The voltage and current waveforms of the conventional flyback power supply device are shown in FIG. 2. The component S1 should be switched on exactly after t1 and off before t2. Usually, t1a is easy to control because t1 refers to the time point that $V_{N2}$ is changed from negative to positive and hence $V_{N2}$ can be used as a trigger signal to make S2 being switched on. However, since t2 is changed with the load, it is very hard to forecast. The component S2 should be switched off at t2a before t1. Otherwise, the capacitor Co will charge the inductor N2 via S2 and a reverse current $(-I_{S1})$ will be produced to burn S1 down while the S1 is switched on again. Although $I_{D1}$ surely can be used to forecast t2, it is impractical due to the following reasons:

(1) The resistor and current transformer are usually used to detect electric current. However, the resistor will consume the electric power and the power consumption will increase while the electric current increases. It may make the effect of replacing D1 with S1 vanish. Furthermore, the current transformer will remove the effect of direct current. Hence, some circuits should be added to recover the level of direct current and that will reduce the accuracy of current detection significantly.

(2) The accuracy of current detection should be very high. Otherwise, the flyback power supply device may be burned down or have low efficient improvement.

Therefore, due to the two reasons above, using S2 to replace D1 becomes a expensive and unstable method.

Accordingly, as discussed above, the conventional flyback power supply device still has some drawbacks that could be improved. The present invention aims to resolve the drawbacks in the prior art.

SUMMARY OF THE INVENTION

An main objective of the present invention is to provide a flyback power supply device and the control method thereof. In accordance with prior art, which used a switch component to control the output of transformer, it can increase the efficiency of the flyback power supply device effectively since the power consumption of the switch component is very low. However, in order to make the flyback power supply device function normally, the times of switching on and off for the switch component should be controlled exactly. As described above, how to effectively control the time of switching on the switch component has been mentioned. But, there are still many problems to control the time of switching off. Therefore, the present invention aims to provide a device and method to effectively control the time of switching off so as to increase the efficiency of the flyback power supply device and make it function normally.

For reaching the objective above, the present invention provides a flyback power supply device, which includes a transformer, primary switch circuit and secondary switch circuit. Therein, the primary switch circuit is connected with the primary side of the transformer and the secondary switch circuit is connected with the secondary side of the transformer. The secondary switch circuit at least includes a switch component and a control circuit. The switch component is used to control the output of the transformer. The control circuit is used to maintain the voltage drop across the switch component and make the resistance of the switch component inversely proportional to the output current.

For reaching the objective above, the present invention provides a control method of the flyback power supply device. In the method, the switch component of the secondary switch circuit, which is connected with the transformer, has a fixed voltage drop so as to make the resistance of the switch component inversely proportional to the output current.

Numerous additional features, benefits and details of the present invention are described in the detailed description, which follows.

DETAILED DESCRIPTION

Figure 3:
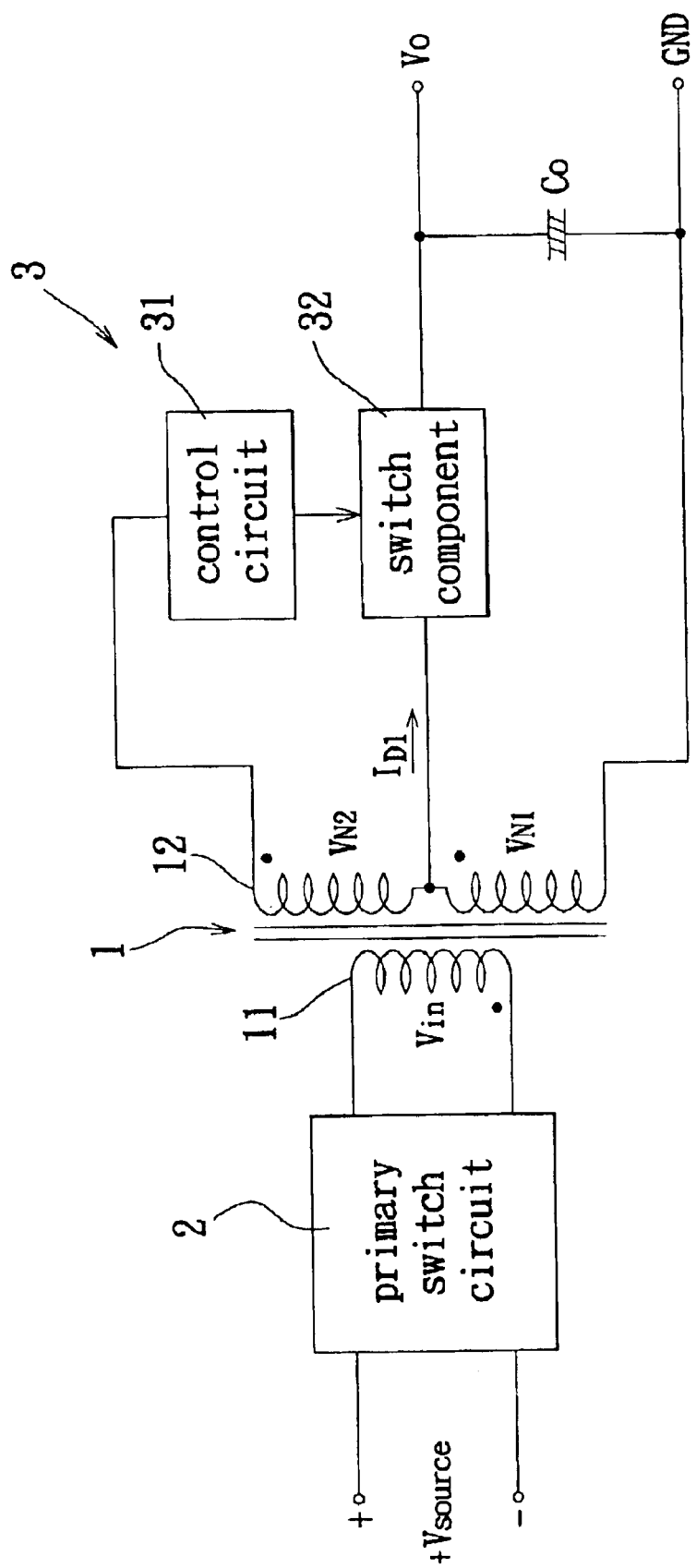
FIG. 3 is a circuit block diagram of the present invention.

Please refer to FIG. 3, which is a circuit block diagram of the present invention. The present invention provides a flyback power supply device, which includes a transformer 1, primary switch circuit 2 and secondary switch circuit 3. Therein, the transformer 1 has a primary side 11 and secondary side 12.

The primary switch circuit 2 is connected with the primary side 11 of the transformer 1 and the secondary switch circuit 3 is connected with the secondary side 12 of the transformer 1. The secondary side 12 has a first output $V_{N1}$ and second output $V_{N2}$. The transformer 1 is mainly used to transfer the power at the primary side 11 to the secondary side 12. The primary side 11 and secondary side 12 both have two terminals each having a voltage opposed to each other and have their corresponding currents.

The primary switch circuit 1 is connected to a power supply with output voltage $V_{SOURCE}$ and is used to generate a high frequency signal $V_{in}$ and a primary current $I_{in}$ so as to control the transiting operation of the secondary side 12.

The secondary switch circuit 3 includes a control circuit 31 and switch component 32. The secondary switch circuit 3 will generate an output voltage Vo via an output capacitor Co by selectively outputting the signal transmitted from the secondary side 12. The secondary switch circuit 3 can control the time of switching on the switch component 32 while the output voltage of the transformer 1 is changed from low to high level. This technique is described in the background of the invention above and will not be detailed.

Figure 1A:
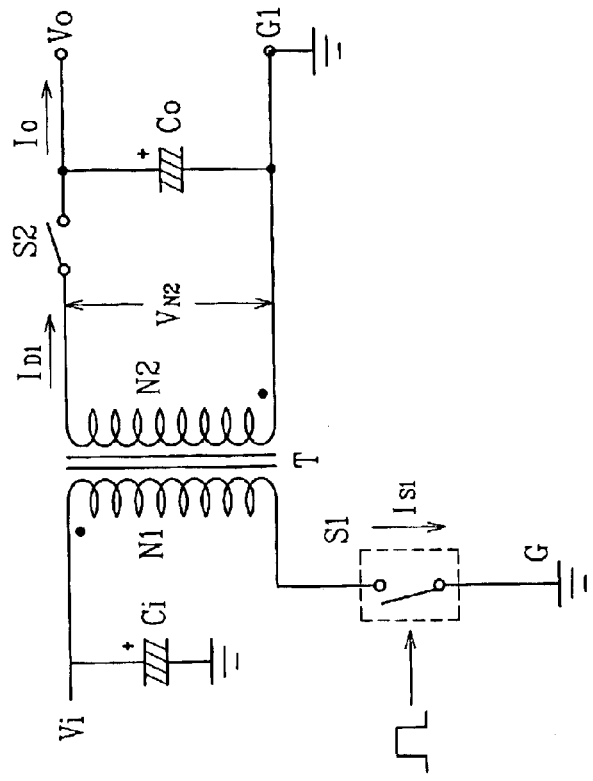
FIG. 1A is a common circuit of the flyback power supply device complied with prior art.
Figure 1B:
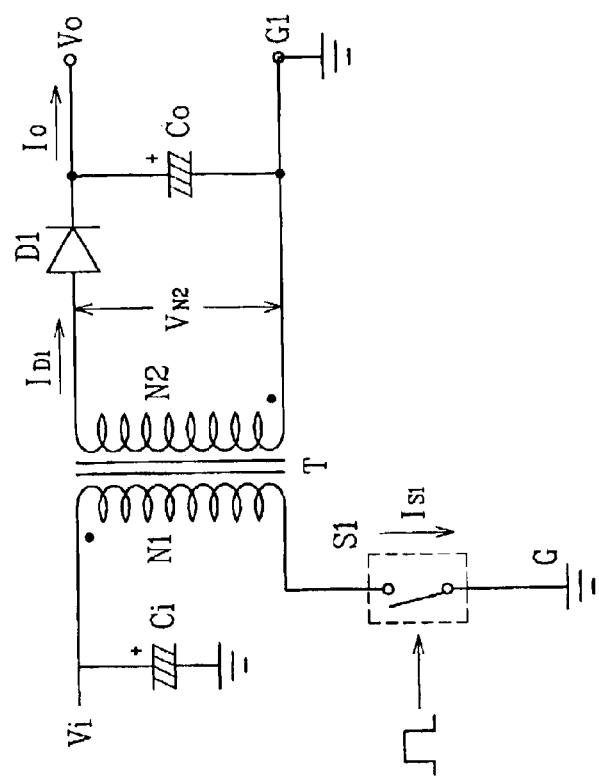
FIG. 1B shows an present circuit of the flyback power supply device complied with prior art.
Figure 2:
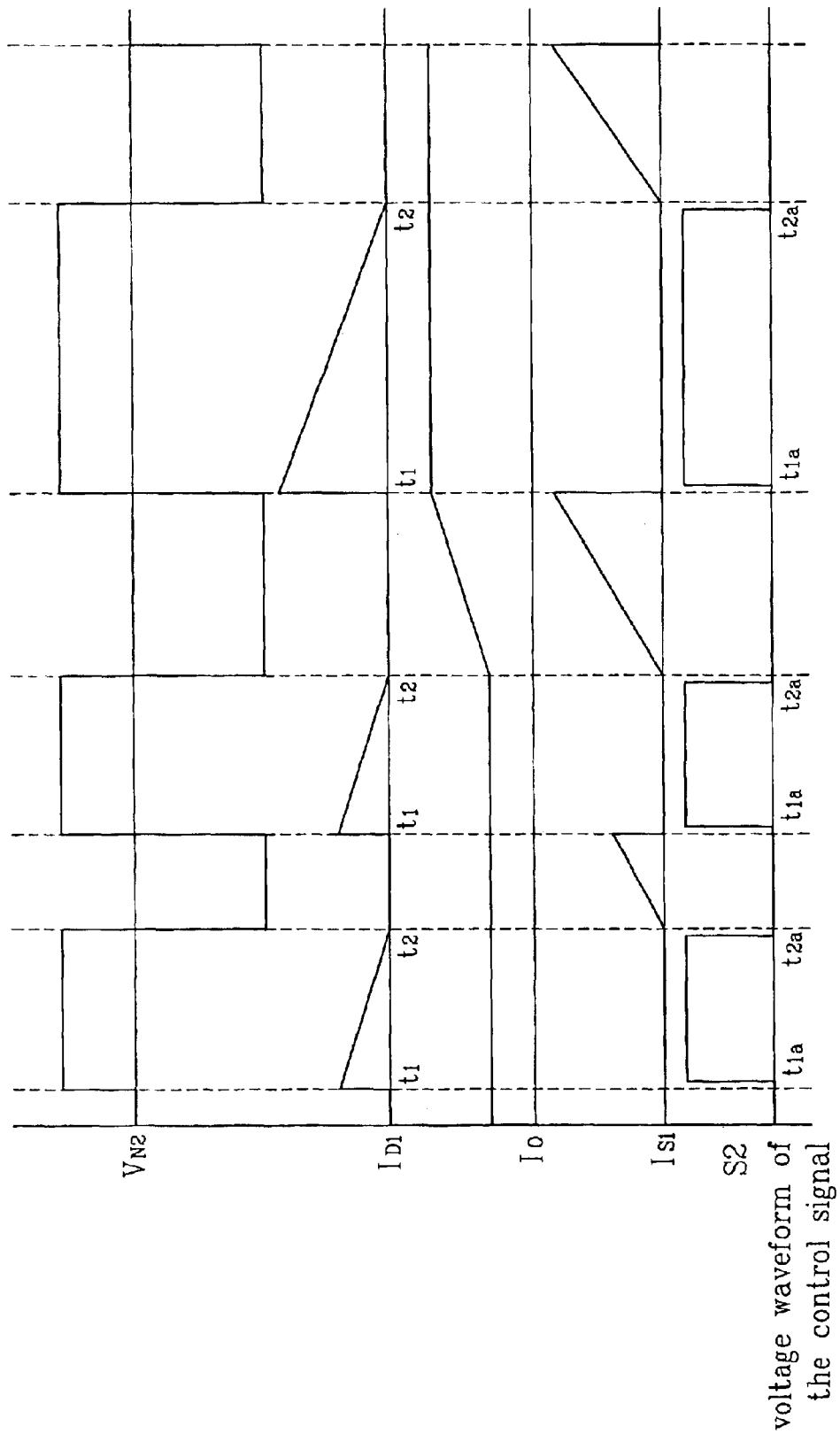
FIG. 2 shows voltage and current waveforms of FIG. 1B.

As to the control of the switching-off time of the switch component 32, the control circuit 31 will keep the voltage across the switch component 32 at a fixed value. Hence, while the output signal $I_{D1}$ of the transformer 1 is changed as shown in FIG. 2, the resistance of the switch component 32 will increase gradually. While the $I_{D1}$ approaches to zero, the resistance of the switch component 32 will approach infinite and the switch component 32 will be turned off before the next voltage transition (from high to low voltage level). Therefore, by making the control circuit 31 to keep the voltage across the switch component 32 fixed to make the resistance of the switch component 32 inversely proportional to the output current, the switching-off time of the switch component can be controlled exactly and the flyback power supply device can function normally during voltage transitions.

Figure 4:
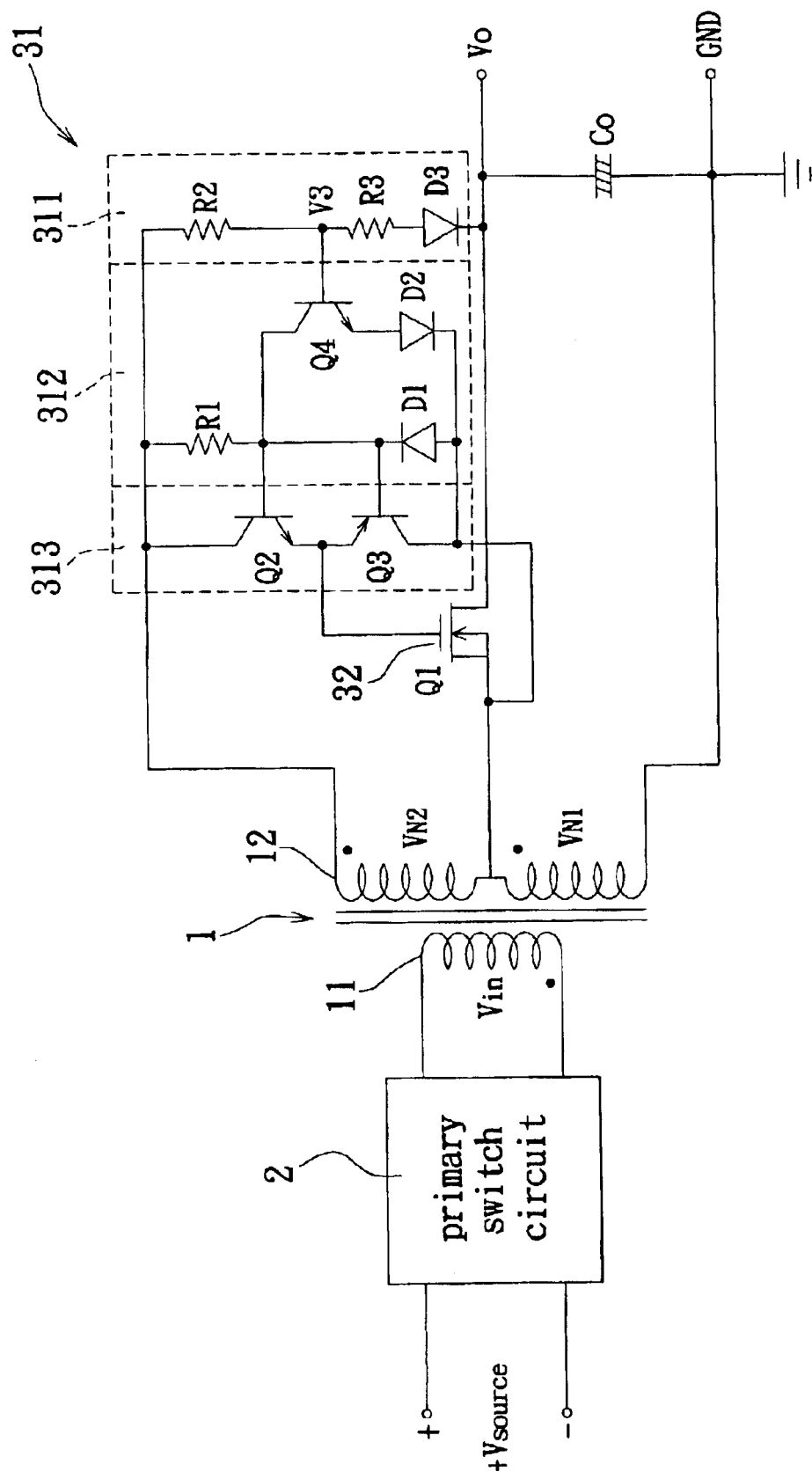
FIG. 4 is an embodiment of the control circuit complied with the present invention.

As shown in FIG. 4, the control circuit 31 includes a reference circuit 311, driving circuit 312 and buffer circuit 313. The reference circuit 311 will provide a reference voltage. The buffer circuit 313 will provide an output voltage to control the resistance of the switch component 32. And, the driving circuit 312 is used to control the output voltage of the buffer circuit 313 according to the reference voltage. Hence, the voltage drop resulted from the electric current flowed through the switch component 32 can be kept at a fixed value to make the resistance of the switch component 32 inversely proportional to the output current.

The switch component 32 is a n-type MOSFET Q1 (it also can be a switch component that can be switched on or off by a small signal, e.g. thyristor). The buffer circuit 313 refers to an emitter follower that includes transistors Q2 and Q3. The driving circuit 312 includes a resistor R1, transistor Q4 and diodes D1 and D2. The reference circuit 311 includes a resistor R2, R3 and a diode D3. Therein, the diodes D1, D2 and D3 are used for current isolation and their voltage drops will be ignored in the following description for convenience. And, the on-resistance of the n-type MOSFET Q1 is assumed as 15 mΩ, the $V_{be}$ of the transistor Q4 as 0.6V and the voltage V3 as 0.65V.

The node of voltage V3 is connected with another parallel circuit loop, which includes the transistor Q4 and the n-type MOSFET Q1. The transistor 04 and the n-type MOSFET Q1 are connected in series via the base and emitter terminals of the transistor Q4 and the source and drain terminals of the n-type MOSFET Q1. Hence, the transistor Q4 can be switched on only when the voltage drop between the source and drain terminals of the n-type MOSFET Q1 is not larger than 0.05V (since the $V_{be}$ of the transistor Q4 should be 0.6V). On the contrary, the transistor Q4 will be switched off while the voltage drop between the source and drain terminals of the n-type MOSFET Q1 is larger than 0.05V.

Therefore, when the output current $I_{D1}$ is changed as shown in FIG. 2 and larger than 3.33 A, the transistor Q4 will be switched off and the voltage Vgs of the n-type.

MOSFET Q1 will switch on the n-type MOSFET Q1. When the output current $I_{D1}$ is smaller than 3.33 A, the transistor Q4 will be switched on and the voltage drop between the source and drain terminals of the n-type MOSFET Q1 will be fixed to 0.05V. When the output current $I_{D1}$ is zero, the n-type MOSFET Q1 will have an infinite resistance and will be switched off automatically.

Figure 5:
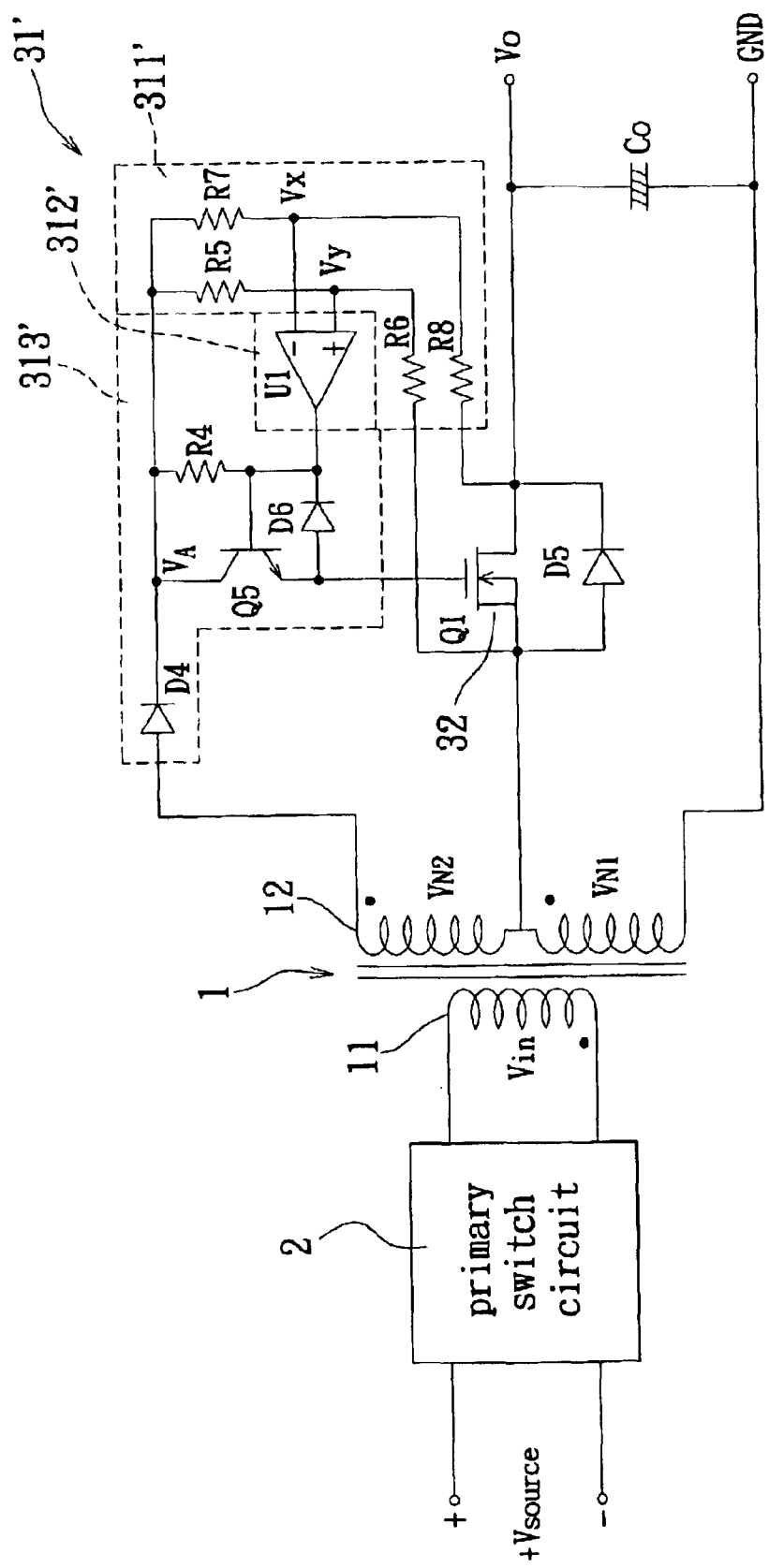
FIG. 5 is another embodiment of the control circuit complied with the present invention.

Please refer to FIG. 5. The control circuit 31' also can be constructed by a voltage dividing circuit 311', comparator 312' and buffer circuit 313'. Therein, the voltage dividing circuit 311' is connected to the two sides of the switch component 32 and used to provide a first and second reference voltages. The buffer circuit 313' is used to output a voltage to control the resistance of the switch component 32. And, the comparator 312' will adjust the output voltage of the buffer circuit 313' according to the comparing result of the first and second reference voltages. Thereby, it will change the resistance of the switch component 32 to keep the voltage drop across the switch component 32 fixed. Hence, it will make the resistance of the switch component 32 inversely proportional to the output current of the transformer 1.

Therein, the voltage dividing circuit 311' includes transistor R5–R8; the buffer circuit 313' includes a transistor Q5, resistor R4 and diodes D4 and D6. The ratio of R8/(R7+R8) is designed to slightly larger than that of R6/(R5+R6). And, VA*[R8/(R7+R8)–R6/(R5+R6)] is around 80 mV. At the beginning of switching on the MOSFET Q1, e.g. the output current $I_{D1}$ of the secondary side 12 of the transformer 1 is changed as shown in FIG. 2, the voltage Vsd of the MOSFET Q1 is larger than 80 mV. Hence, Vy is larger than Vx, the output of the comparator 312' is in high level and the voltage $V_A$ would be used to switch on the MOSFET Q1 via the transistor Q5. When the output current $I_{D1}$ is decreased gradually, the voltage Vsd of the MOSFET Q1 will be smaller than 80 mV. Hence, Vy will be smaller than Vx, the output of the comparator 312' will decrease gradually and the resistance (Rds) of the MOSFET Q1 will be increased to keep the voltage Vsd of the MOSFET Q1 at 80 mV. Hence, while the output current $I_{D1}$ is decreased gradually to zero, the resistance of the MOSFET Q1 will approach to infinite and the MOSFET Q1 will be switched off automatically.

Accordingly, the switch component 32 of the device complied with the present invention may be MOSFET or thyistor, which can be controlled by a small signal. Thereby, the efficiency of the flyback power supply device can be increased. However, the switch component 32 should be exactly switched on after t1 and off before t2. As described in the background of the invention, switching on the switch component 32 after t1 can be reached by using the first output $V_{N1}$ as a trigger signal. Since t1 refers to the time point, at which the value of the first output $V_{N1}$ is changed from negative to positive, the switch component 32 only needs to be switched on after the trigger signal is received. The present invention focuses on how to switch off the switch component 32 before t2. The main operational principle is to keep the voltage drop across the switch component 32 fixed so that the resistance of the switch component 32 will be changed while the output current $I_{D1}$ is changed. Hence, while the value of the output current $I_{D1}$ is zero, e.g. at t2, the resistance of the switch component 32 will approach to infinite and the switch component 32 will be switched off automatically. Therefore, the requirement of switching off the switch component 32 before t2 is reached.

Summing up, the flyback power supply device of the present invention has the following features:

(1) According to the output current $I_{D1}$, the switch component can be switched on or off exactly within t1–t2.

(2) Although the voltage transition is hard to forecast, the switch component can be switched off automatically while the value of the output current $I_{D1}$ is zero.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A flyback power supply device comprising:

a transformer;

a primary switch circuit, which is connected to a primary side of the transformer; and a secondary switch circuit, which is connected to a secondary side of the transformer and at least comprises:

a switch component, which is used to control an output of the transformer; and a control circuit, which is used to keep a voltage drop across the switch component fixed and make a resistance of the switch component inversely proportional to an output current of the transformer.

2. The device as claimed in claim 1, wherein the switch component is a thyristor or metal-oxide-semiconductor field-effect transistor (MOSFET) that is switched on or off by a small signal.

3. A flyback power supply device comprising:

a transformer;

a primary switch circuit, which is connected to a primary side of the transformer; and a secondary switch circuit, which is connected to a secondary side of the transformer and at least comprises:

a switch component, which is used to control an output of the transformer;

a reference circuit, which provides a reference value;

a buffer circuit, which provides a voltage to control a resistance of the switch component; and a driving circuit, which is used to adjust the voltage provided by the buffer circuit according to the reference value to keep a voltage drop across the switch component fixed and make the resistance of the switch component inversely proportional to an output current of the transformer.

4. The device as claimed in claim 3, wherein the switch component is a thyristor or MOSFET that is switched on or off by a small signal.

5. The device as claimed in claim 3, wherein the buffer circuit is a emitter follower.

6. A flyback power supply device comprising:

a transformer;

a primary switch circuit, which is connected to a primary side of the transformer; and a secondary switch circuit, which is connected to a secondary side of the transformer and at least comprises:

a switch component; which is used to control an output of the transformer;

a voltage dividing circuit, which provides a first and second reference values;

a buffer circuit, which provides a voltage to control a resistance of the switch component; and a comparator, which is used to adjust the voltage provided by the buffer circuit according to a comparing value of the first and second reference values to change the resistance of the switch component so as to keep a voltage drop across the switch component fixed and make the resistance of the switch component inversely proportional to an output current of the transformer.

7. The device as claimed in claim 6, wherein the switch component is a thyristor or MOSFET that is switched on or off by a small signal.

8. The device as claimed in claim 6, wherein the voltage dividing circuit is connected to two sides of the switch component.

9. A control method of a flyback power supply device, the method keeping a voltage drop across a switch component of a secondary switch component connected to a transformer fixed and making a resistance of the switch component inversely proportional to an output current of the transformer.

10. The method as claimed in claim 9, wherein the resistance of the switch component is changed from a predetermined value to infinite so as to switch off the switch component while the output current of the transformer is changed from a predetermined value to zero.

11. The method as claimed in claim 9, wherein the switch component is switched on or off by a small signal.

* * * * *

UNITED STATES PATENT AND TRADEMARK OFFICE
CERTIFICATE OF CORRECTION

PATENT NO. : 6,839,248 B2
APPLICATION NO. : 10/426829
DATED : January 4, 2005
INVENTOR(S) : Hui Chang Yang It is certified that error appears in the above-identified patent and that said Letters Patent is hereby corrected as shown below:

On the cover page, item 73, the name of the assignee should read --Niko Semiconductor Co., Ltd.--.

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 6,839,248 B2 Page 1 of 1
APPLICATION NO. : 10/426829
DATED : January 4, 2005
INVENTOR(S) : Hui-Chiang Yang It is certified that error appears in the above-identified patent and that said Letters Patent is hereby corrected as shown below:

On the title page, item (75) Inventor should read -- Hui-Chiang Yang --

Signed and Sealed this

Tenth Day of July, 2007

JON W. DUDAS
*Director of the United States Patent and Trademark Office*